J. T. McGRATH.
SIGNAL DEVICE.
APPLICATION FILED JAN. 19, 1920.
1,415,595.
Patented May 9, 1922.
2 SHEETS—SHEET 2.
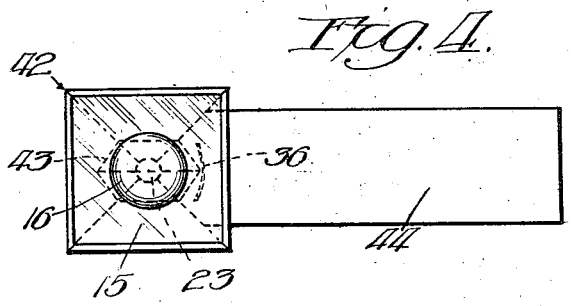
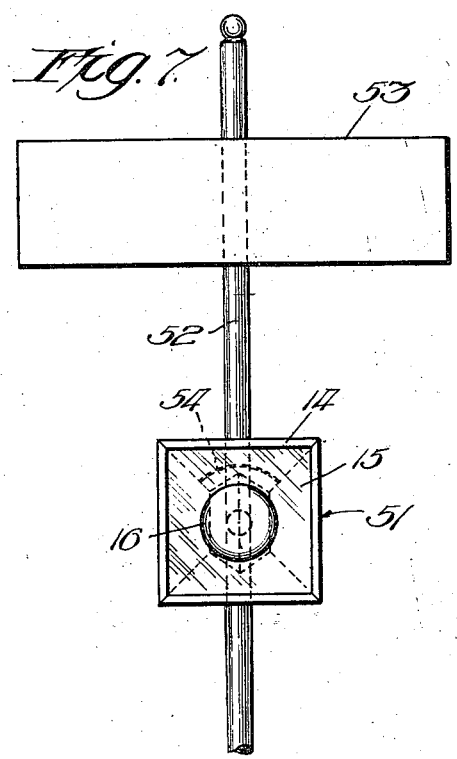
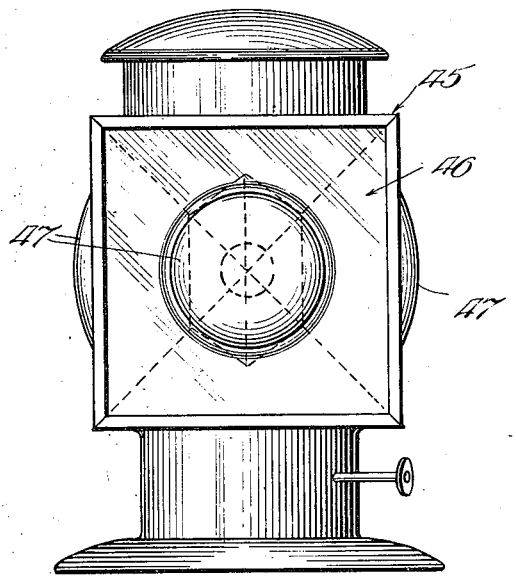
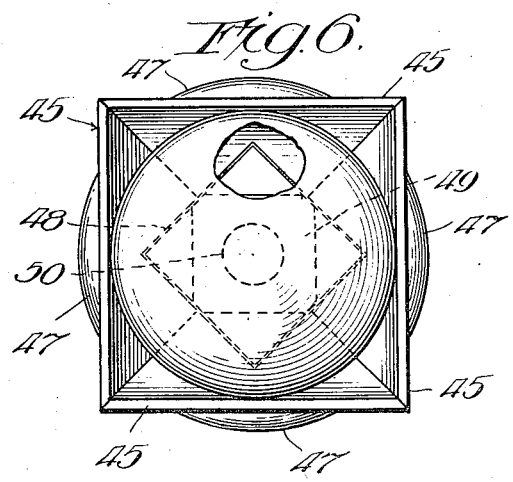
INVENTOR
John T. McGrath
BY
William H. Hale
ATTORNEY

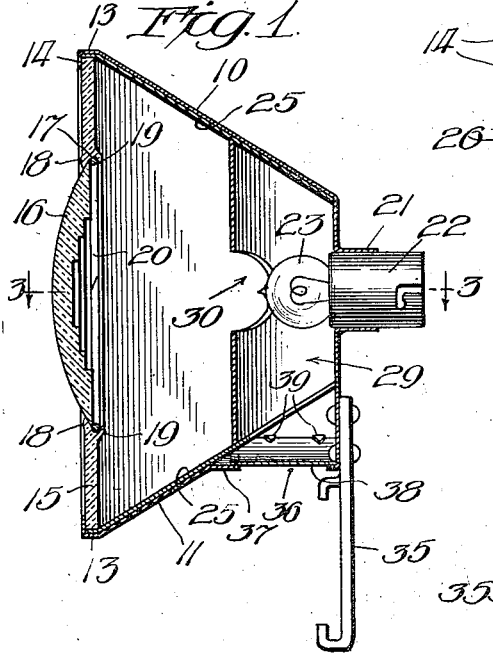
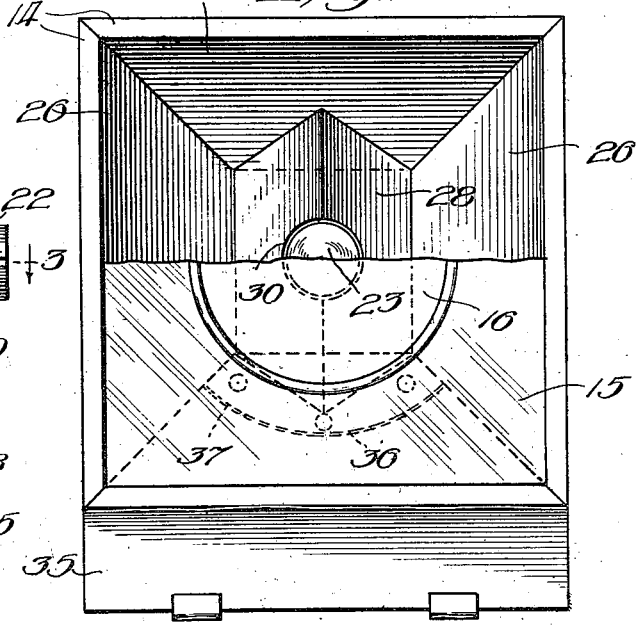
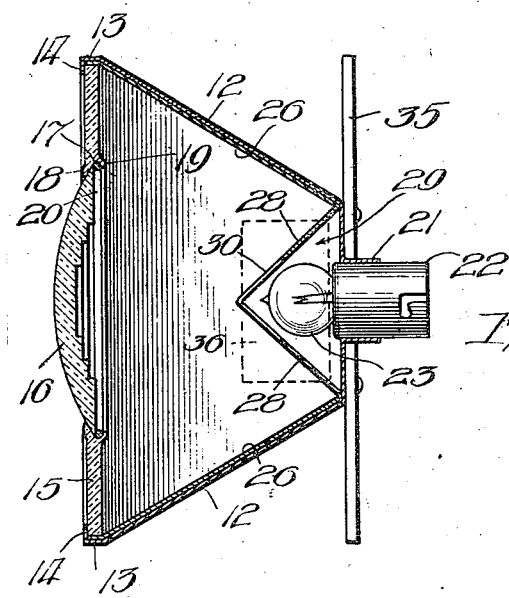

UNITED STATES PATENT OFFICE.

JOHN THOS. McGRATH, OF BLOOMINGTON, ILLINOIS.

SIGNAL DEVICE.

1,415,595. Specification of Letters Patent. Patented May 9, 1922.

Application filed January 19, 1920. Serial No. 352,405.

*To all whom it may concern:*

Be it known that I, JOHN T. McGRATH, a citizen of the United States, and a resident of Bloomington, in the county of McLean and State of Illinois, have invented certain new and useful Improvements in Signal Devices; and I do hereby declare that the following is a full, clear, and exact description thereof, reference being had to the accompanying drawings, and to the characters of reference marked thereon, which form a part of this specification.

This invention relates to a novel combined point source and reflected light illuminated signal device wherein the device, which may be primarily adapted to be illuminated from a point source of light, as an electric or gas lamp, is also constructed with means to be illuminated by mirrors arranged within the casing of the signal device and so constructed and related to a signalling lens that when the point source of illumination fails the lens will be illuminated by exterior light rays which pass into the device and are by the mirrors reflected and diffused within the casing and pass backwardly towards the point from which the outside rays were emitted.

For instance, if the device be employed as a tail light for automobiles the point source of illumination will be an electric bulb or a gas light which is so arranged that its light shaft will be transmitted directly through the lens of the signal device; but in the event such light should fail the machine carrying the light can be, so to speak, picked up by a shaft of light of the head or spot lamps of a machine approaching the first machine from the rear.

The above constitutes one practical use of my novel device but the structure which gives the double function thereto may be employed in many ways as, for instance, such structure may be employed in switch lamps, in signalling devices at railroad and highway crossings to inform the driver of a train or a car that he is approaching a crossing or other condition of roadway which requires caution in approaching it. Again, such signal devices may be employed on bridge approaches being preferably located one at each side of the approach to define to the automobilist, for instance, the pathway to the approach in the dark.

The signal device may also be employed when used on an automobile to illuminate the license tag carried by the machine and is herein shown in some of the figures as adapted to such use. These examples will suggest other uses of the device to those skilled in the art, and it will be understood that the device is not limited in respect of its use in the claims hereto appended, except as to claims where specific structures are enumerated to define a given use.

In the drawings:

Fig. 1 is a vertical section of a combined tail light and license tag support embodying the invention.

Fig. 2 is a front elevation, partially broken away, of the device.

Fig. 3 is a vertical section on line 3—3 of Fig. 1.

Fig. 4 is a rear view of another form of tail light and license tag support for automobiles.

Fig. 5 is an elevation of a railway signal lamp.

Fig. 6 is a plan view of the lamp shown in Fig. 5, with parts in section.

Fig. 7 illustrates adaptation of the signal light to roadway intersections.

The casing of the signal device shown in Figs. 1, 2 and 3 has the general form of a truncated pyramid and may be made of sheet metal. It comprises upper and lower walls 10, 11, respectively, and side walls 12 which, when assembled, give to the casing an outwardly flaring form. The said casing may be made up of sheet metal pieces suitably joined at their edges or may be stamped by a suitable stamping and punching operation. The casing walls are provided at the larger end of the casing with straight rim portions 13 which latter are formed with inwardly turned flanges 14, and within these flanges is seated a glass or other transparent closure or clear lens 15. Said transparent closure 15 is formed with a central opening to receive a lens 16 of any suitable type which lens, as seen from an end elevation looking towards the larger end of the casing, is circular and constitutes the central portion of the device outwardly through which the rays either from the point source of light or the reflected and diffused rays pass to illuminate the lens. This lens will be made of any suitable color depending upon the use to which the device is put. As herein shown, the transparent closure 15 around the lens, which closure in the present instance is of rectangular outline to fit within the seats formed by the plain or straight surfaces of the casing, is formed around its central opening with a groove 17 to receive the circular lens, said groove having an outer wall or lip 18 to overlap the outer face of the marginal portion of the lens and having in rear thereof a shorter lip 19 to receive a resilient locking ring 20 that is seated in the groove 17 in rear of the lens and between it and the lip 19 to lock the lens in place. The said outer casing is formed at its smaller end with a nipple 21 to receive a base or socket 22 in which is supported an electric lamp 23, said nipple and lamp being disposed in the axial center of the lens 16.

Within said casing thus described are mirrored reflecting and diffusing elements upon which rays which enter the transparent or glass closure 15 strike and by which said rays are reflected and diffused within the casing so as to illuminate the lens 16.

As herein shown, the walls 10, 11 and 12 of the outer casing are partially lined by mirrorized plates 25, 26 which fit flat against the elements or plates of the outer casing for a portion of the area of the latter. Two of these mirrorized elements or plates as, for instance, the plates 25 shown in Figure 1, may be co-extensive with their companion casing walls 10 and 11. The other or adjacent plates 26 are herein shown and, preferably, are made of a sheet of mirrorized material, as burnished metal, of a shape to permit the intermediate portion thereof to be formed up in a vertically arranged V shaped reflector which is disposed centrally of the casing with the converging faces thereof obliquely opposed to the mirrorized elements or plates 26 (Figure 3). The formation of this V shaped prism produces in rear thereof a chamber 29 into which the lamp 23 extends. The walls 28 of this prism are cut away at their meeting angle to produce in line with said lamp an opening 30, which is also in line with the axis of the lens 16.

With this construction it will be observed that when the lamp is lighted it constitutes a point source of light to produce a shaft of light that passes directly to and through the lens 16 to illuminate the latter; and the opening 30 is made large enough so that the radiating light from this point source will cover the lens. The inner face of the lens is preferably so formed, as shown in Figures 1 and 3, as to cause the rays to emit therefrom in substantially parallel lines.

Should the light produced by the lamp 23 fail external light entering the casing through the glass closure 15 around the lens will strike the mirrorized surfaces on the elements 25 and 26 and will thereby be reflected against the mirrorized faces of the walls 28 of the prism, whereby some of the light rays will be directly reflected through the lens, and others will be dispersed or diffused within the lamp, with the result that the light entering the casing through the glass closure 15 constitutes by its reflection, diffusion and dispersion a source or backing of illumination which will illuminate the signal lens. This source of reflected, diffused or dispersed light will be stronger if it results from a light shaft projected in the casing as by the head or spot lamp of a vehicle approaching the signal device; or in any event the light rays entering the casing from any source, as general outside, natural or artifical illumination will illuminate the lens sufficiently to produce a distinct signal outline.

In Figures 1, 2 and 3 the signal structure described is shown as adapted to one form of bracket 35 on which may be supported in any suitable manner the usual automobile license tag. The details of the connection of this license tag support and the manner of connecting the device to an automobile is not important so far as the present invention is concerned; and the connection of the signal device to said parts is, therefore, more or less diagrammatically shown.

It is necessary, however, when using the signal device with a license tag support or bracket to provide in lateral alignment with the point source of light an outlet through which the light rays may pass directly from said point source of light along or against the license tag supported by the associated bracket. As shown in Figures 1 to 3, inclusive, the exterior casing is formed to provide a light vent opening designated as a whole by 36 disposed transversely to the casing and, in this instance, the elongation of said vent opening is in the direction of the length of the bracket 35 so that the light rays may pass downwardly transversely across a license tag support in said bracket. To this end the lower wall 11 of the casing is provided with an irregular offset portion 37 in which the vent opening 36 is formed. This vent opening is adapted to be covered by a suitable transparent closure 38 as, for instance, mica, and the lower wall of the parts will be so formed and provided with such suitable fingers 39 as is preferred or desirable to hold the mica in place. In the present instance the configuration of the offset portion 37 is transversely curved as best shown in Figures 1 and 2 so that the mica closure 38 will be curved downwardly at its center away from the lamp 23. The said bracket 35 may be provided with confining hooks to receive and support the license tag, but, as before stated, this detail and the particular manner of attachment of the bracket to the lamp may be otherwise suitably formed.

In Figure 4 is shown a signal device designated as a whole by 42 which, so far as the illumination of the lens from the point source of light and by reflection, diffusion and dispersion may be made like the structure before described and like the parts thereof bear similar reference characters. In this instance the reflecting prism indicated in dotted lines by 43 is horizontally disposed and the vent opening for the light from the point source of light 23, which may either be an electric light or gas light, is located at the side of the casing, and the license tag support 44 extends horizontally away from the casing so as to be illuminated by the light emitted through said vent opening in a manner that will be clearly apparent from a comparison of this construction with that shown in Figures 1, 2 and 3.

In Figures 5 and 6 the general construction of the interior of the lamp therein shown is like that described in respect of Figures 1, 2 and 3. In said latter Figures 5 and 6, the four sides of the lamp comprise surrounding rectangular frames 45, each of which receives a glass or other transparent closure 46 centrally apertured to receive a lens 47 like the lens 16 in the construction previously described. In the construction shown in said Figures 5 and 6 the light reflecting prism is rectangular, the walls 48 thereof meeting at right angles in line with the respective lens 47, said walls enclosing a chamber 49 in which the point source of light 50, shown as an oil burner is located. Openings are formed at the angles where the walls 48 of the prism meet so that the light may pass directly therethrough to the lens 47; and in all directions in this example because of the before cited arrangement of the device. Two of the lenses 47 will, in accordance with the usual practice, be made of colors differentiating from the other two.

In Figure 7 is shown a form of signal device 51 which, without further particular description, may be assumed to be structurally like the form shown in Figures 1, 2 and 3, with the exception of the omission of the parts to adapt the first described construction to the support of a license tag. Like parts of the device shown in Figure 7, which are illustrated, bear reference characters similar to those used in Figures 1, 2 and 3. In the construction shown in Figure 7 the signal device is shown as supported on a post or standard 52 which may be located, for instance, at the juncture of two roadways, where one roadway ends at such juncture. Such post or standard 52 may support any suitable sign board 53, such as an advertising sign, indicating board, or the like. If desired in this use of the device the lamp casing may be formed to provide at its upper side a vent opening, indicated generally at 54 by dotted lines, whereby the light rays from the point source may illuminate the sign board 53.

In all of the uses of the device described and in other uses which will readily occur to those skilled in the art the dual function of directly and indirectly illuminating the signal lens is found, and in a number of the structures shown and others which will suggest themselves the additional function of illuminating an exterior object directed from the point source of light is a secondary feature of the structures.

I claim as my invention:

1. As an article of manufacture, a directly and indirectly illuminated signal device comprising a casing having a light emitting opening, lenses of different tints occupying different zones of said opening, a point source of light within the casing to directly illuminate said lenses, and mutually opposed reflector means within the casing arranged to reflect and diffuse light entering the casing when the point source of light fails to illuminate said lenses.

2. As a new article of manufacture, a directly and indirectly illuminated signal device comprising a casing having a light emitting opening, an outer lens extending across said opening, a lens of different color supported centrally of the first lens, a point source of light to illuminate both lenses, and angularly disposed, mutually opposed mirrors within the casing for reflecting, diffusing, and dispersing light in rear of the lenses, which enters the casing through the first lens radially exteriorly to the second lens, to illuminate the latter lens when the point source of light fails.

3. A directly and indirectly illuminated signal device comprising a casing, a clear lens and a colored lens supported thereby, a point source of light to directly illuminate the colored lens, and mirrors within the casing for reflecting, diffusing, and dispersing light entering the casing through the clear lens in rear of the colored lens to illuminate the latter, said casing having a vent through which light is directly transmitted in another axis from the point source of light to illuminate an external object.

4. A directly and indirectly illuminated signal device comprising a casing, a clear lens and a colored lens supported thereby, a point source of light to directly illuminate the said lenses, and forward throw, mutually reflecting mirrors within the casing for reflecting, diffusing, and dispersing the light entering the casing through the clear lens in rear of the colored lens to illuminate the latter.

5. A signal device comprising a casing, flaring toward its open end, a transparent lens covering said open end, a lens of another color supported on the transparent lens, a point source of light within the casing in line with the latter lens, and angularly disposed mirrorized elements within the casing to reflect and diffuse external light transmitted through the transparent lens radially exterior to the central lens to illuminate the rear of the lenses.

6. A signal device comprising a casing, flaring toward its open end, with its open end covered by a transparent lens centrally supporting a lens of another color, a point source of light within the casing to illuminate the central lens, flaring mirrorized elements within its casing walls, a V shaped reflector within and at the smaller end of the casing enclosing said point source of light, and having an opening in line with said point source of light and said central lens.

7. A signal device comprising a casing, flaring toward its open end, with its open end covered by a transparent lens centrally supporting a lens of another color, a point source of light within the casing to illuminate the central lens, flaring mirrorized elements within its casing walls, a V shaped reflector within and at the smaller end of the casing enclosing said point source of light, and having an opening in line with said point source of light and said central lens, said casing being provided in rear of said V shaped reflector with a light vent opening, for the purposes set forth.

8. A directly and indirectly illuminated signal device comprising, in combination with an open casing having forward throw, angularly disposed reflecting and diffusing interior reflector elements, a clear lens closing the opening in the casing for transmitting natural light to the casing, a colored lens supported centrally of the clear lens, and a point source of light within the casing in line with and in rear of the colored lens.

In witness whereof I claim the foregoing as my invention, I hereunto append my signature this 15th day of January, 1920.

JOHN THOS. McGRATH.